US007848733B2

(12) United States Patent
Bull et al.

(10) Patent No.: US 7,848,733 B2
(45) Date of Patent: Dec. 7, 2010

(54) EMERGENCY WIRELESS LOCATION SYSTEM INCLUDING A LOCATION DETERMINING RECEIVER

(75) Inventors: Jeffrey F. Bull, Chalfont, PA (US); Rashidus S. Mia, Phoenixville, PA (US); Robert J. Anderson, Phoenixville, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 923 days.

(21) Appl. No.: 11/648,774

(22) Filed: Dec. 28, 2006

(65) Prior Publication Data

US 2008/0160952 A1 Jul. 3, 2008

(51) Int. Cl.
*H04M 11/04* (2006.01)
(52) U.S. Cl. ............. 455/404.2; 455/404.1; 455/456.1; 455/456.2; 455/456.3; 455/456.6; 370/328; 370/338; 370/352; 370/355; 370/356
(58) Field of Classification Search ............. 455/404.1, 455/404.2, 456.1–456.6; 379/45, 37; 370/352–356, 370/259, 328, 338
See application file for complete search history.

(56) References Cited

U.S. PATENT DOCUMENTS

| 6,006,067 | A  | * | 12/1999 | Rudowicz ............. 455/13.4 |
| 6,026,305 | A  |   | 2/2000  | Salinger et al. |
| 6,363,138 | B1 |   | 3/2002  | Aprile ................. 379/45 |
| 6,522,297 | B1 |   | 2/2003  | Rabinowitz et al. ....... 342/458 |
| 6,665,611 | B1 |   | 12/2003 | Oran et al. ............. 701/213 |
| 6,678,357 | B2 |   | 1/2004  | Stumer et al. ........... 379/45 |
| 6,717,547 | B2 |   | 4/2004  | Spilker, Jr. et al. ...... 342/464 |
| 7,027,564 | B2 |   | 4/2006  | James ................. 379/37 |
| 7,035,289 | B2 |   | 4/2006  | Devine et al. .......... 370/493 |
| 7,130,646 | B2 | * | 10/2006 | Wang ................. 455/456.5 |
| 7,277,712 | B2 | * | 10/2007 | Burke ................. 455/456.1 |
| 7,496,182 | B2 | * | 2/2009  | Coster et al. ............ 379/45 |
| 7,548,537 | B2 | * | 6/2009  | Pfleging et al. .......... 370/352 |
| 7,593,512 | B2 | * | 9/2009  | Elliot et al. ............ 379/33 |
| 2005/0026589 | A1 | | 2/2005 | Holland et al. |
| 2005/0190892 | A1 | | 9/2005 | Dawson et al. .......... 379/37 |
| 2005/0249193 | A1 | | 11/2005 | Epley |

(Continued)

FOREIGN PATENT DOCUMENTS

WO WO 2008/085440 7/2008

(Continued)

OTHER PUBLICATIONS

Charny, B., "FAQ: FCC sets rules for VoIP 911," *News.com*, http://news.com.com/FAQ+FCC+sets+rules+for+VoIP+911/2100-7352_3-5746838.html, 2005, 2 pages.

(Continued)

*Primary Examiner*—Charles N Appiah
*Assistant Examiner*—Olumide T Ajibade Akonai
(74) *Attorney, Agent, or Firm*—Woodcock Washburn LLP

(57) ABSTRACT

A wireless location system may include geolocation of a wireless device connected to Voice-over-Internet-Protocol (VoIP) adapter. The VoIP adapter may include a wireless transceiver or a wireless location determining receiver that facilitates the location of a wireless device connected to the VoIP adapter. The wireless transceiver or the location determining receiver may provide location information to an emergency dispatcher.

47 Claims, 6 Drawing Sheets

U.S. PATENT DOCUMENTS

| | | | |
|---|---|---|---|
| 2006/0030290 A1* | 2/2006 | Rudolf et al. | 455/404.1 |
| 2006/0245570 A1 | 11/2006 | Pfleging et al. | |
| 2006/0274729 A1 | 12/2006 | Self | 370/352 |
| 2006/0277187 A1 | 12/2006 | Roese et al. | 707/9 |
| 2006/0293024 A1* | 12/2006 | Benco et al. | 455/404.2 |
| 2007/0030841 A1* | 2/2007 | Lee et al. | 370/352 |
| 2007/0058615 A1* | 3/2007 | Hasenfang et al. | 370/352 |
| 2007/0060097 A1* | 3/2007 | Edge et al. | 455/404.1 |
| 2007/0189270 A1 | 8/2007 | Borislow et al. | |
| 2007/0189271 A1 | 8/2007 | Borislow et al. | |
| 2007/0211692 A1* | 9/2007 | Boroski et al. | 370/351 |
| 2008/0144779 A1* | 6/2008 | Ray et al. | 379/45 |
| 2008/0160953 A1 | 7/2008 | Mia et al. | |

FOREIGN PATENT DOCUMENTS

| | | |
|---|---|---|
| WO | WO 2008/085444 | 7/2008 |

OTHER PUBLICATIONS

Federal Communications Commission, "Commission Requires Interconnected VoIP Providers to Provide Enhanced 911 Service," *FCC News*, May 19, 2005, 2 pages.

Martin et al., "Before the Federal Communications Commission, Washington, D.C. 20554: In the Matters of: IP-Enabled Services and E911 Requirements for IP-Enabled Service Providers," *Federal Communications Commission*, 2005, *FCC 05-166*, 1-91.

Oates, J., "VoIP phones get warning 911 sticker," *The Register®*, http://www.theregister.co.uk/2005/06/15/fcc_911_rules/print.html, Jun. 15, 2005, 2 pages.

Ott, J., "Location Servers," *ipDialog, Inc.*, Jun. 13, 2001, 4 pages.

Smith, T., "Vonage calls up USB key phone," *Reg Hardware*, http://www.reghardware.co.uk/2006/10/05/vonage_uk_v-phone/, 2006, 2 pages.

Telecommunications Industry Association, "Enhanced Wireless J-STD-036-A-1 9-1-1 Phase 2," *TR-45*, 2003, 1-1—9-3.

Telecommunications Industry Association, "Joint Standard: Enhanced Wireless 9-1-1 Phase 2," Jun. 2002, *J-STD-036-A (Revision of IS-J-STD-036)*, 294 pages.

"In the Matter of Wireless E911 Location Accuracy Requirements: Comments of Motorola, Inc.," Before the Federal Communications Commission, Washington, D.C. 20554, Aug. 20, 2007, 1-15.

"In the Matter of Wireless E911 Location Accuracy Requirements: Comments of Telecommunication Systems, Inc. (TCS)," Before the Federal Communications Commission, Washington, D.C. 20554, Aug. 20, 2007, 1-8.

Atis, "Technical Report: Location Acquisition and Location Parameter Conveyance for Internet Access Networks in Support of Emergency Services," *Emergency Services Interconnection Forum*, Jan. 4, 2007, 010407-037, 1-45.

Zhu, Y. et al., "SUPL 2_0 Support Emergency VoIP Calls," *Open Mobile Alliance*, Jan. 26, 2007, 1-12.

Williams, C., "VoIP providers reined in by regulator," *The Register*, http://www.theresgister.co.uk/2007/03/29/ofcom_voip/print.html, 2007, 2 pages.

International Search Report, dated Sep. 29, 2008, 9 pages.

"Notice of ExParte and Presentation magicJack VoIP E911: Automatic Location Information ("ALI") Technology Solution," Ymax Corporation, May 11, 2009, pp. 1-19, total 21 pages.

"In the Matter of Wireless E911 Location Accuracy Requirements: Comments of Verizon," Before the Federal Communications Commission, Washington, D.C. 20554, Aug. 20, 2007, 1-6.

"In the Matter of Wireless E911 Location Accuracy Requirements: Comments of Vonage America, Inc.," Before the Federal Communications Commission, Washington, D.C. 20554, Aug. 20, 2007, 1-32.

"In the Matter of Wireless E911 Location Accuracy Requirements: Comments of YMAX Corporation," Before the Federal Communications Commission, Washington, D.C. 20554, Aug. 20, 2007, 1-7.

Spradling, P. et al., "E911 Caller Location of Indoor Cellular and VoIP Devices," *University of Colorado; Capstone Project*, Apr. 2, 2007, 1-37.

Jones, D., "CES: Clearwire Gets a WiFi Ally," Unstrung, Jan. 8, 2009, 1 page.

Churchill, S., "Netgear mobile router," dailywireless.org, Jan. 7, 2009, p. 1-8.

"at&t unwraps 3g microcell with gps," Macintosh News Networks, Inc., © 1995-2005, 1 page.

"Patent Cooperation Treaty: International Search Report," International Searching Authority, Apr. 3, 2008, 10 pages.

PCT International Preliminary Examination Report dated Feb. 18, 2010, issued in PCT/US07/26262.

PCT International Search Report dated Apr. 3, 2008, issued in PCT/US07/26262.

PCT International Preliminary Examination Report dated Jun. 30, 2009, issued in PCT/US07/26256.

PCT International Search Report dated Sep. 29, 2008, issued in PCT/US07/26256.

\* cited by examiner

EMERGENCY WIRELESS LOCATION SYSTEM INCLUDING A LOCATION DETERMINING RECEIVER

CROSS REFERENCE

This application describes subject matter related to the subject matter described in co-pending application Ser. No. 11/648,818, filed Dec. 28, 2006, which is hereby incorporated by reference in its entirety.

TECHNICAL FIELD

The present invention relates generally to methods and apparatus for locating wireless communication devices and transmitting the location to an emergency operator, or Public Service Answering Point (PSAP). More particularly, but not exclusively, the present invention relates to methods and apparatus for locating communications devices connected to a Voice-over-Internet Protocol telephone adaptor and transmitting the location to an emergency services operator or allowed service. The present invention may be employed to locate emergency callers in accordance with Enhanced 911 (E911) regulations in the United States, or to locate emergency callers in other jurisdictions around the world.

BACKGROUND

A. Wireless Location

The process of determining the physical location of devices that emit radio frequency (RF) energy is known as geolocation. Many techniques exist for geolocation of RF emitters. A common geolocation technique is known as time-difference-of-arrival (TDOA). Classically, geolocation via TDOA is accomplished by simultaneously acquiring the RF emitter's signal at a multiplicity of sensors that are at different, and known, locations. The TDOA between any pair of the multiplicity of sensors is the difference in the time it takes the RF energy to propagate from its point of origin to each of the two sensors. The measurement of the TDOA between two sensors in two dimensions of known location yields a hyperbola with the two sensors coincident with the foci of the hyperbola. The hyperbola yields a multiplicity of locations that the RF energy could have emanated from. Deriving multiple hyperbolas from other pairs of sensors will produce a unique location from which the RF energy emanated. Geolocation of a RF emitter with TDOA in two dimensions requires that the signal be received with a sensor at a minimum of three distinct geographic locations. Each pair of sensors yields a hyperbola as the potential source of RF energy. Geolocation of a RF emitter with TDOA in three dimensions requires that the signal be received with a sensor at a minimum of four distinct geographic locations. Each pair of sensors yields a hyperboloid as a surface as the potential source of RF energy.

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. The '144 patent describes what may be referred to as an uplink-time-difference-of-arrival (U-TDOA) cellular telephone location system. The described system may be configured to monitor control channel transmissions from one or more cellular telephones and to use central or station-based processing to compute the geographic location(s) of the phone(s). For example, in station-based processing, which may be employed for reverse control channel signal detection, cross-correlations are performed at the cell sites (or signal collection systems). For each "strong" signal, which may be considered a reference signal, received on a particular control channel at a particular first cell site, that strong signal is first applied to a signal decoder, such as that used by the cellular system itself. This decoder demodulates the cellular signal to produce the original digital bit stream which had been modulated to produce the cellular signal. This digital bit stream is then modulated by the cell site system to reconstruct the original signal waveform as it was first transmitted by the cellular telephone. This reconstructed signal waveform is cross-correlated against the received signal at the first cell site. The cross-correlation produces a peak from which an exact time of arrival can be calculated from a predetermined point on the peak. The first cell site system then sends the demodulated digital bit stream and the time of arrival to the central site over the communications line. The central site then distributes the demodulated digital bit stream and the exact time of arrival to other cell sites likely to have also received the cellular transmission. At each of these other second, third, fourth, etc., cell sites, the digital bit stream is modulated by the cell site system to reconstruct the original signal waveform as it was first transmitted by the cellular telephone. This reconstructed signal waveform is cross-correlated against the signal received at each cell site during the same time interval. The cross-correlation may or may not produce a peak; if a peak is produced, an exact time of arrival (TOA) can be calculated from a predetermined point on the peak. This TOA is then sent to the central site, and a delay difference, or TDOA, for a particular pair of cell sites can be calculated. This method permits the cell site systems to extract TOA information from an extremely weak signal reception, where the weak signal may be above or below the noise level. This method is applied iteratively to sufficient pairs of cell sites for each strong signal received at each cell site for each sample period. The results of the delay pairs for each signal are then directed to the location calculation algorithm.

An example of a wireless location system (WLS) of the kind described above is depicted in FIG. 1. As shown, the system includes four major subsystems: the Signal Collection Systems (SCS's) 10, the TDOA Location Processors (TLP's) 12, the Application Processors (AP's) 14, and the Network Operations Console (NOC) 16. Each SCS is responsible for receiving the RF signals transmitted by the wireless transmitters on both control channels and voice channels. In general, an SCS (now sometimes called an LMU, or Location Measuring Unit) is preferably installed at a wireless carrier's cell site, and therefore operates in parallel to a base station. Each TLP 12 is responsible for managing a network of SCS's 10 and for providing a centralized pool of digital signal processing (DSP) resources that can be used in the location calculations. The SCS's 10 and the TLP's 12 operate together to determine the location of the wireless transmitters. Both the SCS's 10 and TLP's 12 contain a significant amount of DSP resources, and the software in these systems can operate dynamically to determine where to perform a particular processing function based upon tradeoffs in processing time, communications time, queuing time, and cost. Each TLP 12 exists centrally primarily to reduce the overall cost of implementing the WLS. In addition, the WLS may include a plurality of SCS regions each of which comprises multiple SCS's 10. For example, "SCS Region 1" includes SCS's 10A and 10B that are located at respective cell sites and share antennas with the base stations at those cell sites. Drop and insert units 11A and 11B are used to interface fractional T1/E1 lines to full T1/E1 lines, which in turn are coupled to a digital access and control system (DACS) 13A. The DACS 13A and another DACS 13B are used in the manner described more fully below for communications between the SCS's 10A, 10B, etc., and multiple TLP's 12A, 12B, etc. As shown, the TLP's are typically collocated and interconnected via an Ethernet network (backbone) and a second, redundant Ethernet network. Also coupled to the Ethernet networks are multiple AP's 14A and 14B, multiple NOC's 16A and 16B, and a terminal server 15. Routers 19A and 19B are used to couple one WLS to one or more other Wireless Location System(s).

Geolocation techniques have become increasingly important to locate wireless devices as required by the Wireless Communications and Public Safety Act of 1999. Wireless devices present unique challenges to providing location information to emergency dispatchers, because they may not be in a fixed location. Enhanced 911 or E911 was developed as a feature of the 9-1-1 emergency calling system that automatically associates a physical address with the calling party's telephone number. Therefore, wireless devices may be located even if they are not in a fixed location.

E911 location techniques may include non-network-based location options for E911 Phase II that typically use the Navistar Global Positioning System (GPS) augmented with data from a landside server that includes synchronization timing, orbital data (Ephemeris) and acquisition data (code phase and Doppler ranges) as originally described in U.S. Pat. No. 4,445,118 (Taylor, et al).

Additionally, other wireless location techniques that generally cannot deliver E9-1-1 Phase II accuracies may be deployed in the carrier network to locate wireless devices. For example, these wireless location techniques may include forward channel techniques, such as EOTD (enhanced observed time difference of arrival), AFLT (advanced forward link trilateration) and enhanced cell-ID (ECID) where a wireless device collects the forward channel timings and/or signal strengths for relaying to an Serving Mobile Location Center (SMLC) or other landside server for location calculation. Additionally, non-wireless communication network techniques, such as the HDTV-based Rosum TV-GPS system described in U.S. Pat. No. 6,717,547, Apr. 6, 2004, "Position location using broadcast television signals and mobile telephone signals" and U.S. Pat. No. 6,522,297, Feb. 18, 2003, "Position location using ghost canceling reference television signals," and the LORAN (LOng RAnge Navigation) may be deployed to locate wireless devices.

Furthermore, cell-based location techniques may be used to locate a wireless device. Inherent in the wireless carrier network are cell-based location techniques that may have been used to develop the position of the wireless. These techniques, also known as FCC E9-1-1 Phase I techniques, can generate a location based on the serving cell, the serving sector (if the cell is sectorized) or cell/sector with ranging (based on timing advance, ½ round trip time, or path-loss estimates).

B. Voice-Over-Internet Protocol

Today, the Voice-over-Internet Protocol (VoIP) market is becoming increasingly popular as a less expensive alternative to traditional telephone services. Voice-over-Internet Protocol presents challenges similar to wireless devices in providing location information to emergency dispatchers, because a Voice-over-Internet Protocol adapter and the Voice-over-Internet Protocol network are not directly interconnected with the 9-1-1 network. Currently if an emergency services number is dialed from a commercial VoIP service, depending on how the VoIP provider handles such calls, the call may be connected to a carrier designated answering point, or it may be connected to a non-emergency number at the public safety answering point associated with the billing or service address of the caller. Because a VoIP adapter can be plugged into any internet connection with sufficient bandwidth, the caller may actually be hundreds or even thousands of miles away from the service address, yet if the call goes to an answering point at all, it may be the one associated with the caller's billing or service address and not the actual originating location.

Thus, in 2005, the Federal Communications Commission (FCC) passed an order requiring that Voice-over-Internet Protocol providers begin to provide E911 services to their customers. In this specification we will disclose methods and apparatuses for locating communication devices connected to a Voice-over-Internet Protocol telephone adaptor and transmitting the location to emergency services such as a universal Emergency Response number or short code [e.g. 9-1-1 (North America), 1-1-2 (EU), 9-9-9 (UK), 0-0-0 (Australia)] or the GSM wireless communication designated 1-1-2 global emergency number. Multiple individual numbers may be used dependent on the country of operation with police, fire, ambulance, civil defense, and public utilities known as common examples of these alternate emergency services numbers. Use of any of these numbers may be pre-programmed into the example embodiment. Use of non-mandated numbers may require prior agreement with the wireless carrier. Illustrative embodiments may use the terms 9-1-1, and Public Safety Answering Point (PSAP) in place of the multiple dialed digit codes and answering services possible.

SUMMARY

The following summary is intended to explain several aspects of the illustrative embodiments described in greater detail below. This summary is not intended to cover all inventive aspects of the disclosed subject matter, nor is it intended to limit the scope of protection of the claims set forth below.

One illustrative embodiment of the present invention takes the form of an apparatus for facilitating emergency services in connection with a Voice-over-Internet-Protocol (VoIP) call. The apparatus may include a first interface for communicating signals to and from a telephone and a second interface for communicating signals to and from an Internet Protocol (IP) network. Additionally, the apparatus may include a processor operatively coupled to a computer readable medium, a wireless transceiver, a location determining receiver, and to the first and second interfaces. The computer readable medium may include instructions for causing the processor to detect the initiation of an emergency call by the telephone. The computer readable medium may further include instructions to actuate the wireless transceiver in response to the detection of the emergency call. The wireless transceiver may thereby be used to conduct the emergency call over a wireless communications network (e.g., a cellular telephone network), and this may permit the location of the wireless transceiver, and therefore the VoIP adaptor, to be determined by an external wireless location system. Additionally, the computer readable medium may further include instructions to actuate the location determining receiver. The location determining receiver may determine the location of the interface in response to the detection of the emergency call. The location may then be routed to a PSAP in a conventional manner.

Other aspects of the embodiments disclosed herein are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
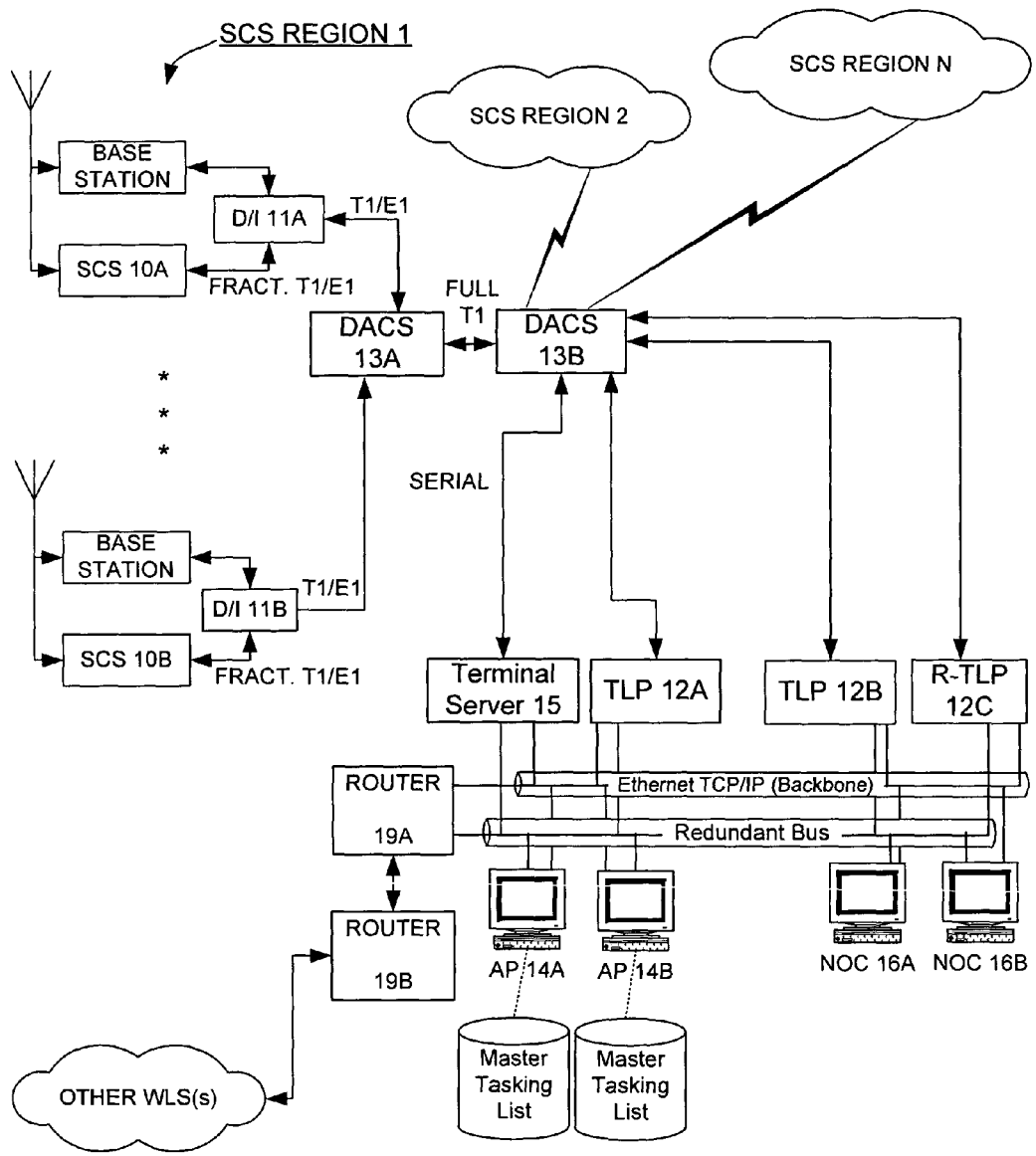
FIG. 1 depicts an example embodiment of a wireless location system (WLS).
Figure 2:
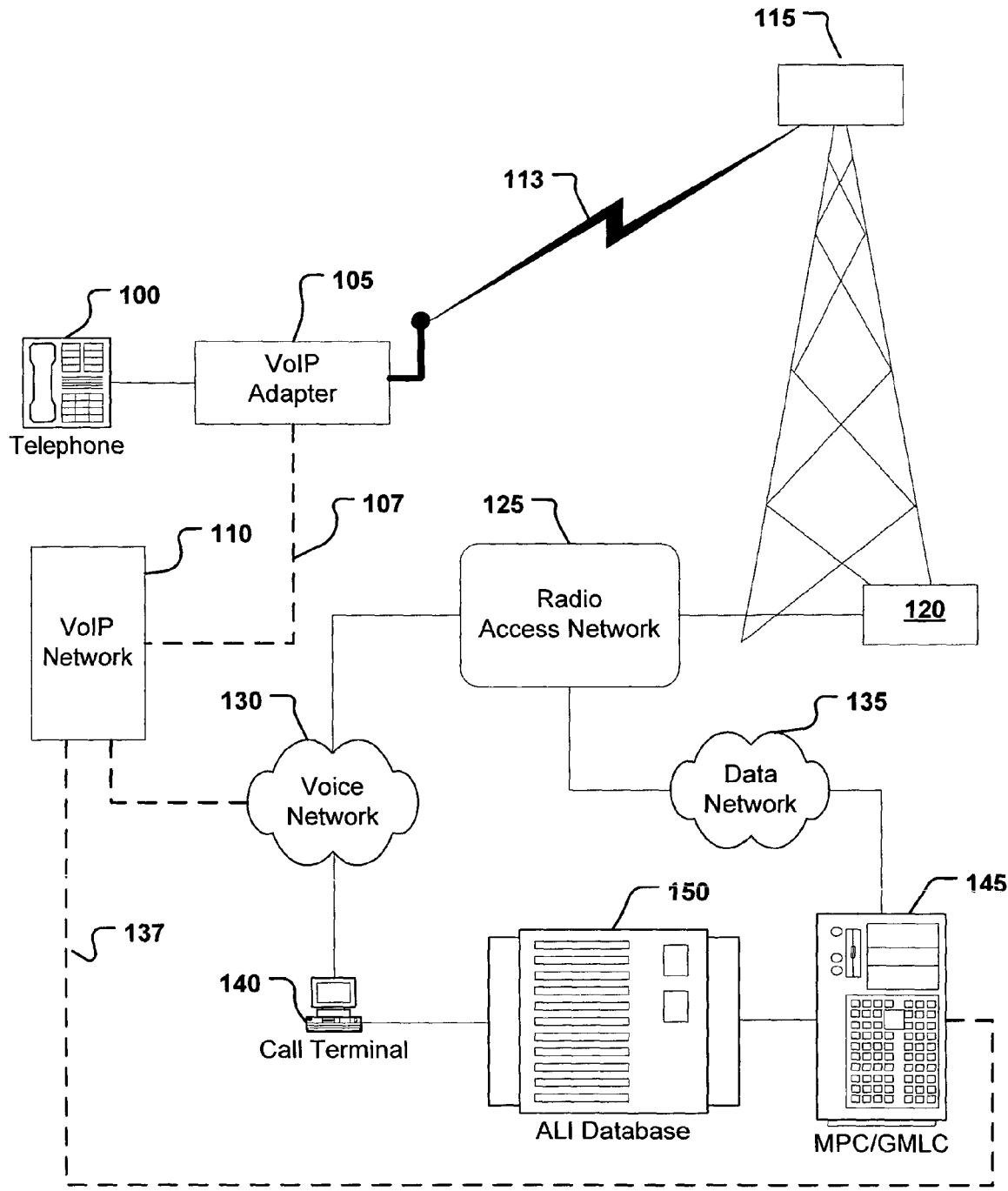
FIG. 2 depicts an exemplary operating network including an illustrative embodiment of a Voice over IP (VoIP) adapter.

As shown in FIG. 2, a telephone 100 may be in operative communication with a VoIP adapter 105 using, for example, a wired link such as a USB cable, an Ethernet cable, or a Local Area Network (LAN) line, or a wireless link such as a Bluetooth connection. Telephone 100 may include, for example, one or more typical analog telephones, one or more portable phones, and microphones and headsets or speakers connected to one or more computers. Additionally, telephone 100 and VoIP adapter 105 may be one unit, for example, VoIP adapter 105 may be a built in feature of telephone 100.

VoIP adapter 105 may include components such as an interface, a processor, a computer readable medium, a wireless transceiver, a location determining receiver, or the like implemented therein. VoIP adapter 105 may detect whether an emergency call has been made on telephone 100. After detecting whether an emergency call has been placed, VoIP adapter 105 may conduct the call over a wireless network as a non-VoIP call. The location information of telephone 100 may then be routed to an Emergency Services operator (or Public Safety Answering Point) or to any other suitable number that may accept a call with location information via the wireless network, which will be described in more detail below. Additionally, VoIP adapter 105 may normally conduct the call over a wireless network as a VoIP call using, for example, the General Packet Radio Services (GPRS) features of the wireless network. The interconnection of the GPRS network, or any other wireless backhaul system, to a VoIP network 110 and subsequently to the Local Exchange Carrier (LEC) may be transparent to the user. In the an example embodiment, for an emergency call, the GPRS functionality (and thus the digital VoIP call) may be disabled for the activating phone and the emergency call conducted over the wireless voice communications voice link such that VoIP adapter 105 may be automatically located and the location conveyed to the Emergency Services operator or Public Safety Answering Point as specified in the ANSI/ETSI J-STD-036, "Enhanced Wireless 9-1-1 Phase 2" and subsequent revisions. After the disconnection of the Emergency Services call, the operation of VoIP adaptor 105 and a wired or wireless backhaul 107 return to normal operational mode for the originating phone. In a multi-line system, throughout this operation, other digital traffic, including non-emergency voice communications, can proceed without interruption over wired or wireless backhaul 107.

Additionally, VoIP adapter 105 may conduct the call over VoIP network 110 while a parallel call may be launched by VoIP adapter 105 over a wireless network to trigger an external wireless location system to provide a location estimate of telephone 100. The location information may be provided to a 9-1-1 operator terminal via the wireless network including a Mobile Positioning Center (MPC) or Gateway Mobile Location Center (GMLC) connection to an Automatic Location Identifier (ALI) database, which will be described in more detail below. Alternatively, the location information, which may include a self-discover position via the LOng RAnge Navigation (LORAN) system or a GNSS (Global Navigation Satellite system) such as the USAF's Navstar Global Position Satellite system, may be inserted into packets that may be transmitted via VoIP network 110 to the 9-1-1 operator, which will be described in more detail below.

VoIP adapter 105 may be in operative communication with VoIP network 110 via wired or wireless backhaul 107 using for example, a wired link such as LAN line or a wireless link such as wireless antenna. VoIP network 110 may include media gateways, signaling controllers, Internet Protocol (IP) network connections or the like such that VoIP network 110 provides functionalities similar to a circuit-switched network. Additionally, VoIP network 110 may perform all of the same tasks that the public switched telephone network (PSTN) does, in addition to performing a gateway function to the existing public network. According to one embodiment, an emergency call may be placed from telephone 100 to VoIP network 10. VoIP network 10 may provide E911 Pseudo-ANI in place of the calling number. For example, the location information may be provided to the 9-1-1 operator rather than or in addition to the calling number.

VoIP adapter 105 may also be in communication via a wireless link 113 such as a radio link with a base transceiver station (BTS) 115 of a wireless communications system using, for example, a wireless antenna attached to VoIP adapter 105. BTS 115 may be a standard BTS operated by a wireless phone carrier. When VoIP adapter 105 detects an emergency call from telephone 100, VoIP adapter 105 may covert the call to a wireless call placed via BTS 115.

Figure 4:
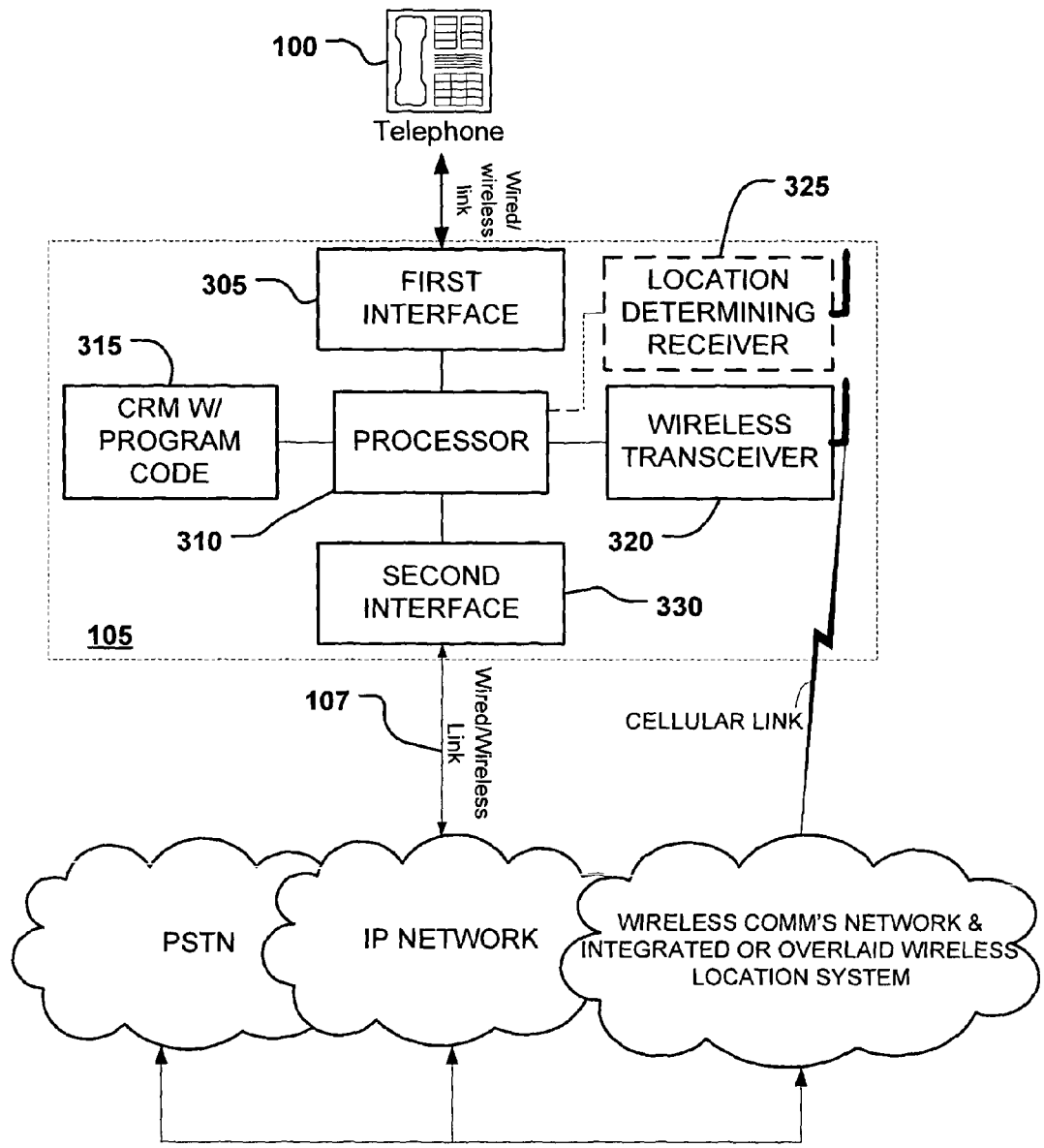
FIG. 4 depicts an example embodiment of a VoIP adapter.

BTS 115 may include a location component 120 implemented thereon. Location component 120 may include network based location technologies that may provide the location of a wireless transceiver 320 implemented in VoIP adapter 105, as shown in FIG. 4, to a landside server (e.g. a GMLC or MPC) for delivery to a call terminal 140. Additionally, location component 120 may include network based location technologies that may provide the network-developed location back to VoIP adaptor 105 for further use in non-emergency VoIP communications, for example, by placing the developed location information in the Geographical Location element of the Session Initiation Protocol (SIP) invitation of the VoIP call from telephone 100.

According to one example embodiment, location component 120 may provide, for example, uplink-time difference of arrival (U-TDOA) or location determination. The U-TDOA method may calculate the location of, for example, a device by using the difference in time of arrival of signals at different receivers, known as Location Measurement Units (LMUs), using existing cell towers, radio antennas, and infrastructure. For example, a device may transmit a signal that may be received by different receivers at times that are proportional to the length of the transmission path between the device and each receiver. The U-TDOA method may not require knowledge of when the device transmits; rather, the U-TDOA method may use the time difference between pairs of LMUs as the baseline measurement, generating hyperbolic plots that may represent all possible distances of the device from each receiver. The intersection of three or more such hyperbolas may locate the position of the transmitting device. Additionally, the U-TDOA system may use timing data from as many as 50 receiving antennas, enabling the highest accuracy for a network-based system.

According to another example embodiment, location component 120 may provide, for example, Angle of Arrival (AoA) location determination. The Angle of Arrival (AOA) method may use an antenna containing a multiple element array in which the exact location of each AOA element is known precisely. Each element may be small and capable of receiving a separate signal. By measuring signal strength, time of arrival, and phase at each element of the array, it may be possible to calculate the line-of-sight path from transmitter to receiver. Placing another receiver with the same antenna configuration in a different location may allow you to repeat the process. The intersection point of the two line-of-sight paths may represent the location of the transmitting device. Like U-TDOA, AOA may require, for example, specialized receivers at the base stations in addition to the construction of directional antenna arrays on the existing cell tower.

Additionally, location component 120 may provide location determination of telephone 100 using any other suitable technique such as cell-ID, cell and sector, cell-sector-ranging, or forward-link-trilateration.

Location component 120 may also supply information for wireless broadcast delivery allowing wireless transceiver 320, as shown in FIG. 4, to self-locate using, for example, time-of-arrival (TOA), forward link trilateration (FLT), Advanced-forward-link-trilateration (AFLT), Enhanced-forward-link-trilateration (E-FLT), Observed Difference of Arrival (OTD), Enhanced Observed Difference of Arrival (EOTD), Observed Time Difference of Arrival (O-TDOA), or Assisted GPS (A-GPS).

In one embodiment, location component 120 may use Enhanced Observed Time Difference (EOTD) to allow wireless transceiver 320, shown in FIG. 4, to self-locate. EOTD may use signals from at least four different cellular base stations to compute a device's location. Using E-OTD, the device may measure the arrival times of, for example, a call from different cellular antennas with signals stronger than a minimum value. These time-of-arrival (TOA) measurements may be transmitted to a landside server and then may be normalized, setting the time-of-arrivals to a common clock, before a Time Difference of Arrival (TDOA) calculation may be performed. Prior knowledge of the timing of transmissions from each base station must be known through deployment of geographically-deployed fixed receivers or other calibration technique before TOAs can be normalized. If all base stations are synchronous in their transmission times, no normalization, and thus no fixed receivers may be needed. Additionally, a suitably modified device may be synchronous in its transmission times.

In another embodiment, location component 120 may use Enhanced Cell Identification (E-CID) to allow wireless transceiver 320, shown in FIG. 4, to self-locate. Cell Identification (CID) may include the process of using the network's knowledge of the device within the controlling cell site and communicating the sector information. Using the geographical center of this area may provide a rough estimate of the location of the user, regardless of the type of device that may be deployed. Enhanced Cell ID (E-CID) may use CID along with additional Timing Advance (TA) and Power Measurement (PM) information derived from the wireless network to improve location accuracy.

According to yet additional embodiments, other suitable location techniques and systems may also be used to allow wireless transceiver 320, shown in FIG. 4, to self-locate. These systems may include, for example, the Global Navigation Satellite Systems (such as GPS), the Rosum TV-GPS, and/or the LORAN system.

For example, an Assisted Global Positioning Satellite (A-GPS) receiver that may be capable of receiving and processing signals transmitted by orbiting GPS satellites may be used to allow wireless transceiver 320, shown in FIG. 4, to self-locate. A-GPS may combine the time the signal reaches the A-GPS receiver with knowledge of the transmitter's position in space to estimate the distance from the satellite to a device. By making four or more such measurements, it may be possible to tri-laterate using, for example, TDOA, and calculate the precise location of the device. A-GPS may use a separate server (with its own GPS receiver) at a precisely known location, because the typical database containing satellite positions and timing may be very large. This server may communicate the information to the mobile station to help it in its calculations of estimated distances from satellites.

Alternatively, for example, a LORAN (LOng RAnge Navigation) system may be used to allow wireless transceiver 320, shown in FIG. 4, to self-locate. LORAN may include a terrestrial navigation system using low frequency radio transmitters that may use the time interval between radio signals received from three or more stations. LORAN may be based on the principle of the time difference of arrival (TDOA) between the receipt of signals from at least three synchronized radio transmitters. For each pair of transmitters the position of the receiver may be determined as being on a hyperbolic curve where the time difference between the received signals is constant. With three synchronized radio transmitters stations, and thus two pairs and two hyperbolic curves, the geographic receiver location may be determined from intersection of the hyperbolic curves.

Location component 120 may be connected to a radio access network 125. Radio access network 125 may receive the location information from location component 120. Radio access network 125 may include a radio network controller, a base station, several transmitters and/or receivers, or the like such that radio access network 125 may perform the radio functionality of the wireless network. Radio access network 125 may manage the radio link between, for example, telephone 100 and the wireless telephone network.

Radio access network 125 may further include connections to a call terminal 140 via a voice network 130 and a MPC/GMLC server 145 via a data network 135. Radio access network 125 may direct the voice of a user of telephone 100 making an emergency call to call terminal 140 via voice network 130 such that a 9-1-1 operator may receive the call at call terminal 140. Call terminal 140 may include, for example, a Public Safety Answering Point (PSAP) Call Taker Terminal. The PSAP Call Taker Terminal may be responsible for answering 9-1-1 calls for emergency assistance.

Additionally, radio access network 125 may direct the location information of telephone 100 to MPC/GMLC server 145 via data network 135. The Mobile Positioning Center (MPC) of MPC/GMLC server 145 may be used for a Code-Division Multiple Access (CDMA) wireless network or a Time Division Multiple Access (TDMA) wireless network. Additionally, the Gateway Mobile Location Center (GMLC) of MPC/GMLC server 145 may be used for a Global System for Mobile (GSM) communication wireless network.

MPC/GMLC server 145 may be connected to an Automatic Location Identifier (ALI) database 150. The location information received at the MPC/GMLC server 145 via data network 135 may be transferred to ALI database 150. ALI database 150 may map the location information received from MPC/GMLC server 145 to an address indexed therein. The address may then be transmitted from ALI database 150 to call terminal 140 where it may be dispatched to the appropriate emergency service providers.

Additionally, the call may be routed to any other suitable number that may accept a call with location information, such as an electric power company, a security agency, or the like, via the GMLC of MPC/GMLC server 145. For example, the location-based services application may use the GMLC of MPC/GMLC server 145 to store the autonomously developed location for retrieval by the power company. Alternatively, the location based services application may transmit the location via a Serving Mobile Location Center (SMLC) and wireless communications network after the wireless call has been received.

Alternatively, if VoIP adapter 105 detects an emergency call from telephone 100, VoIP adapter 105 may conduct the call via VoIP network 110 using the IP network. According to one embodiment, the location information may be calculated by VoIP adapter 105 using existing Enhanced 911 (E911) techniques that may be employed via a wireless network. The location information may also be calculated from a previously determined location or Global Positioning Satellite (GPS) coordinates. The location information may then be inserted into IP packets transmitted when a call is placed via telephone 100. For example, the location information may be inserted into the Session Initiation Protocol (SIP) invitation of the VoIP call from telephone 100. The location information and voice of the user of telephone 100 may then be forwarded to call terminal 140. The location information may then be decoded such that call terminal 140 may notify the appropriate emergency services provider the location of telephone 100.

Figure 3A:
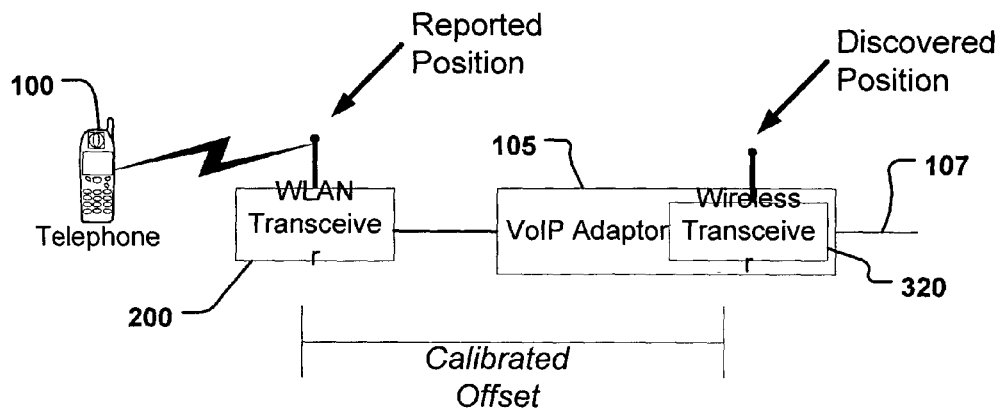
FIGS. 3A-3C depicts example embodiments of the calibration of a wirelessly extended VoIP system.

FIG. 3A depicts the calibration of a wirelessly extended VoIP system. According to one embodiment, telephone 100 may be in communication with a Wireless Local Area Network (WLAN) transceiver 200. WLAN transceiver 200 may be connected to VoIP adapter 105, that includes a wireless transceiver 320. WLAN transceiver 200 may receive a reported position from telephone 100. The location of telephone 100 may then be calibrated offset from wireless transceiver 320 whose position may be "discovered" by the wireless location system. The discovered position may include a position automatically detected by wireless transceiver 3201 using existing E911 techniques such as conducting a call via a wireless network as described above. Additionally, the discovered position may include a location stored in VoIP adapter 105 and/or wireless transceiver 320 from a previous call.

The calibration of the wirelessly extended VoIP system may function accordingly. For example, each floor of a hi-rise building may have a WiFi Access Point and the building may provide VoIP to its occupants via telephone 100. Telephone 100 may include, for example, WiFi handsets, or the like. After an accident, a co-worker may dial 9-1-1 using telephone 100. The WiFi system may carry the call origination messaging over WLAN transceiver 200 via the access point and wired building network to VoIP adaptor 105 and wireless transceiver 320. The emergency call may recognized by the dialed digits and routed to wireless transceiver 320. The call may then be connected to call terminal 140, shown in FIG. 2.

The discovered position of the wireless transceiver may be adjusted or updated with the calibration information previously stored in VoIP adapter 105 and/or wireless transceiver 320 before being routed to call terminal 140, shown in FIG. 2.

Figure 3B:
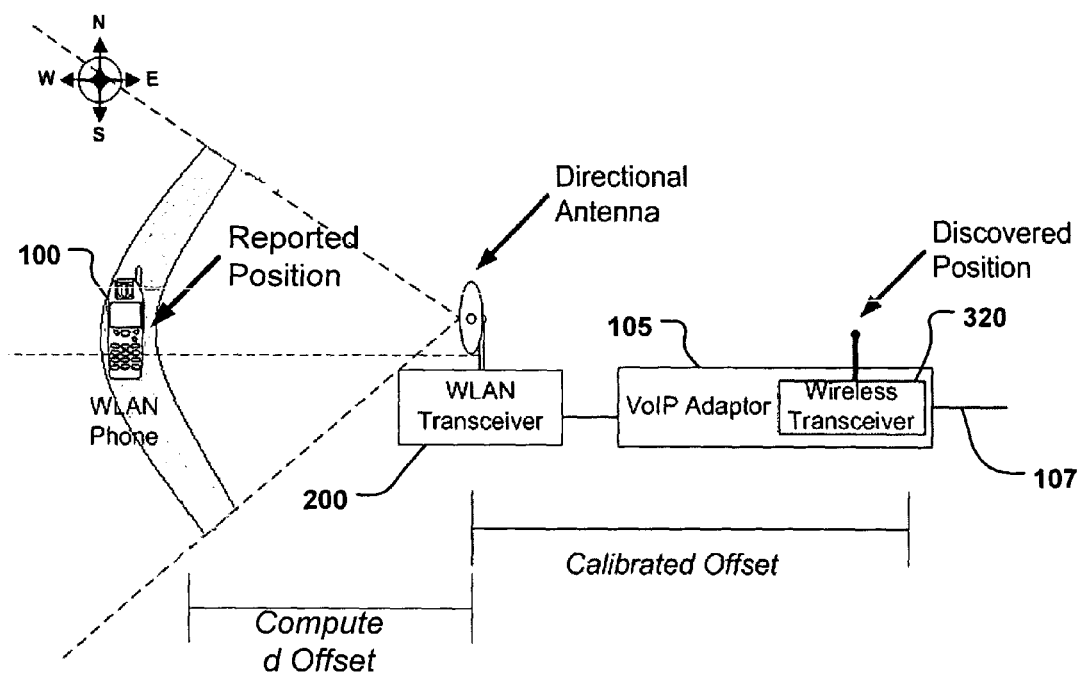

FIG. 3B depicts the calibration of a wirelessly extended VoIP system with the WLAN system being capable of location determination. According to one embodiment, the WLAN transceiver 200 may use direction and range received, for example, from a directional antenna to determine a location. The location may then be applied to the discovered location at wireless transceiver 320 with a calibrated offset. The discovered position may include a position automatically detected by wireless transceiver 320 using existing E911 techniques such as conducting a call via a wireless network as described above. Additionally, the discovered position may include a location stored in VoIP adapter 105 and/or wireless transceiver 320 from a previous call.

The calibration of the wirelessly extended VoIP system may function accordingly. For example, a college campus may include a network of WLAN Access Points with directional antennas. A VoIP adaptor 105 may be located in each building such that VoIP adapter 105 may provide VoIP services to that building and other locations nearby. After an accident, a student may dial 9-1-1 using telephone 100. WLAN transceiver 200 may carry the call origination messaging over the WLAN network via an access point and wired or wireless backhaul 107 to VoIP network 110. The emergency call may then be recognized by dialed digits or an emergency services indicator. The emergency call may then be routed to wireless transceiver 320. Telephone 100 may produce a reported position that may be used to calculate a computed offset at WLAN transceiver 200. For example, the calibrated position of WLAN transceiver 200 may be calculated by a refinement of location by signal strength or round-trip-time range estimate from telephone 100. If a directional antenna is connected to WLAN transceiver 200, the location estimate may be refined further by, for example, limiting the area to that served by the antenna. This location may generate a computed offset from telephone 100 and WLAN transceiver 200. Additionally, a calibrated offset may be calculated between WLAN transceiver 200 and wireless transceiver 320, as described in FIG. 3A. The computed offset and the calibrated offset may be combined with the discovered position of wireless transceiver 320 to produce location information. The location information may then be routed to call terminal 140.

Figure 3C:
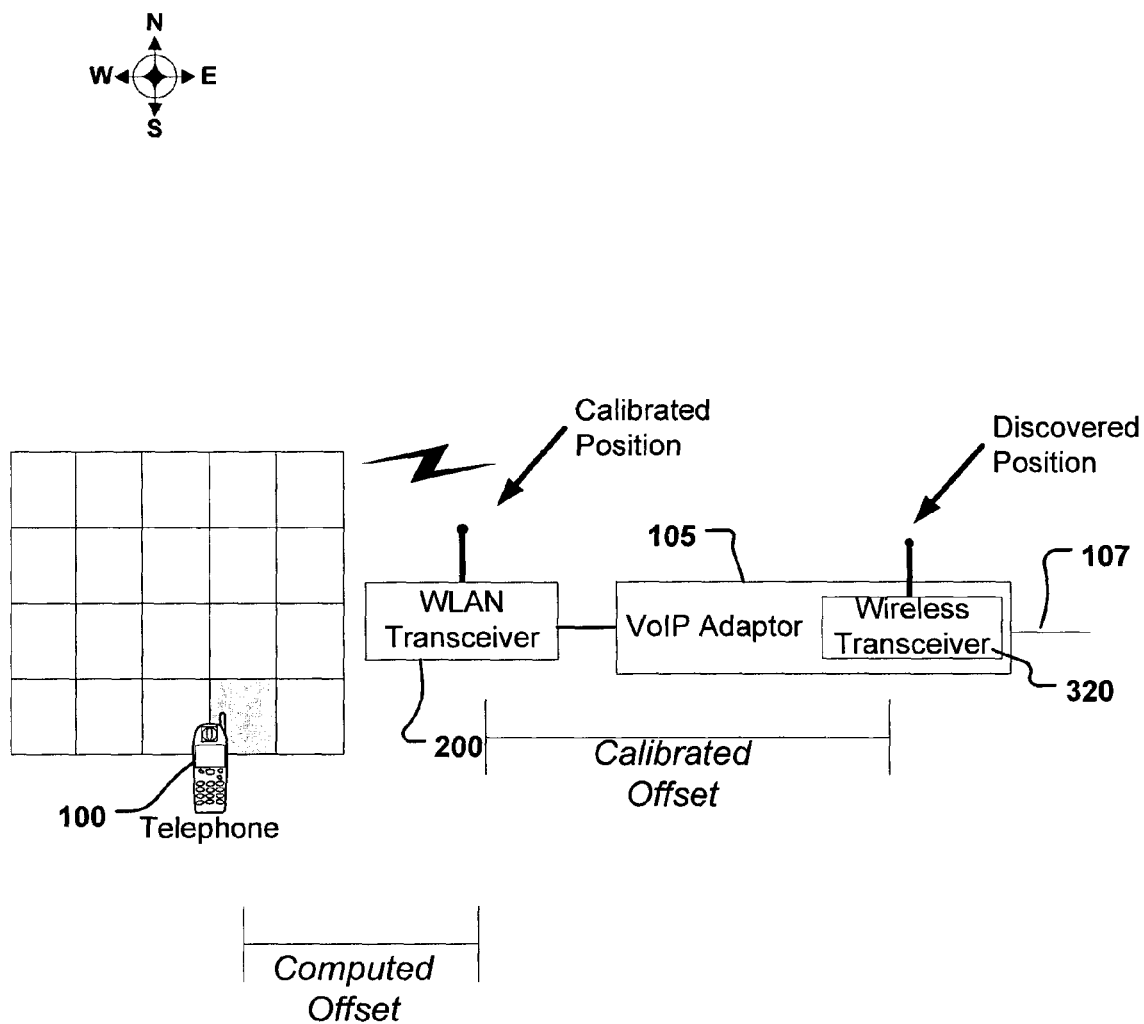

FIG. 3C depicts another example embodiment of the calibration of a wirelessly extended VoIP system with the WLAN system being capable of location determination. According to one embodiment, the WLAN system may use calibrated field strength measurements or RF fingerprinting to determine the location of telephone 100. The location may then be applied to the discovered location with any calibrated offset. The discovered position may include a position automatically detected by wireless transceiver 320 using existing E911 techniques such as conducting a call via a wireless network as described above. Additionally, the discovered position may include a location stored in wireless transceiver 320 from a previous call. The calibrated offset may be calculated as the offset between the WLAN transceiver 200 and the wireless transceiver 320, which was described above.

The calibration of the wirelessly extended VoIP system may function accordingly. For example, a large multi-building factory may include a network of WLAN Access Points. The network may have been extensively calibrated using a grid mapping arrangement consists of multiple access points and multiple VoIP adaptors 105 interconnecting the various buildings voice/data networks and to the public telephony/data network. After an accident, an employee may dial 9-1-1. The WiFi system may carry the call origination messaging over the WLAN network via WLAN transceiver 200 and wired or wireless backhaul 107 to VoIP network 110. The emergency call may be recognized by the dialed digits or an emergency services indicator. The emergency call may then be routed to wireless transceiver 320. The calibrated position of the WLAN transceiver 200 may provide a rough location including building and floor number. Using the RF data gathered from the RF grid mapping, the location estimate of telephone 100 may be further refined by the computed offset. The computed offset may be calculated between telephone 100 and WLAN transceiver 200 using the RF grid map. Once calculated, the computed offset and the calibrated offset or the offset between the WLAN transceiver 200 and wireless transceiver 320 may be combined with the discovered position of wireless transceiver 320. The location information may then be routed to call terminal 140.

FIG. 4 illustrates an example embodiment of VoIP adapter 105. As shown in FIG. 4, VoIP adapter 105 may include a first interface 305, a processor 310, a computer readable medium 315, wireless transceiver 320, a location determining receiver 325, and a second interface 330. First interface 305 may communicate signals to and from telephone 100 such as the voice of the user of telephone 100 and the 9-1-1 operator at the other end of the emergency call. First interface 305 may be operatively coupled to processor 310. Processor 310 may include, for example, a typical computer processor. Processor 310 may also be coupled to computer readable medium 315. Computer readable medium 315 may include, for example, random access memory, read only memory, storage drives, or the like. Computer readable medium 315 may include instructions that cause processor 310 to detect the initiation of an emergency call by a user of telephone 100. Computer readable medium 315 may also include instructions that actuate wireless transceiver 320 and/or location determining receiver 325. For example, if an emergency call is detected, processor 310 may request additional instructions from computer readable 315. Those additional instructions may be used by processor 310 to actuate wireless transceiver 320 and/or location determining receiver 325. Additionally, computer readable medium 315 may store the location information of VoIP adapter 105 for future use.

Processor 310 may be coupled to wireless transceiver 320. Wireless transceiver 320 may be actuated when an emergency call is detected by processor 310 such that transmissions of wireless transceiver 320 allows wireless transceiver 320 to be located via network-based location means and the location information of telephone 100 may be calculated and delivered to call terminal 140, shown in FIG. 2. For example, wireless transceiver 320 may include wireless bypass circuitry that converts the VoIP emergency call to an emergency call over a wireless network. Additionally, the location information of telephone 100 may be calculated and delivered to VoIP adaptor 105 either via wireless link 113 that may include a radio link such as GPRS or SMS or via a connection 137 from the GMLC/MPC server 145 to VoIP network 110, shown in FIG. 2. If the location is delivered to VoIP adaptor 105 for future use, VoIP adaptor 105 could be correlated to the developed location by an ID of wireless transceiver 320 (e.g. the MIN (mobile identification number), the IMSI (International Mobile Station ID), the ESN (Electronic Serial Number), the IMEI (International Mobile Equipment Indentity) or the subscriber's phone number. VoIP network 110, shown in FIG. 2, may have to maintain a correlation database of IDs of wireless transceiver 320 corresponding to the appropriate VoIP subscribers to assure proper routing. If the call is routed to another suitable number that accepts location information, such as a power company or security company, the wireless network provider may allow wireless transceiver 320 to have access to the wireless network when, for example, power or the connection to VoIP adapter 105 has failed and wireless transceiver 320 may have access to a battery backup (e.g., a laptop battery or UPS).

Additionally, processor 310 may be coupled to wireless transceiver 320 and to location determining receiver 325. Location determining receiver 325 may be actuated when an a call is detected by processor 310. Location determining receiver 325 may develop a location for immediate use in the call and/or retain the location for future use. This discovered location may be modified with calibrated and/or computed location offsets to develop a reportable location based on the information stored in VoIP adapter 105. In the case of where an emergency call is being placed (for instance to a emergency operator), wireless transceiver 320 may be actuated when an emergency call is detected by processor 310 such that wireless transceiver 320 provides the reportable location information of telephone 100 for delivery to call terminal 140, shown in FIG. 2. For example, wireless transceiver 320 may include wireless bypass circuitry that converts the VoIP emergency call to an emergency call over a wireless network. In this example, the discovered position from location determining receiver 325 including any modifications from calibrated and/or computed location offsets may be sent to MPC/GMLC server 145 and ALI database 150 for eventual delivery to the emergency operator using call terminal 140, shown in FIG. 2.

Alternatively, processor 310 may be coupled to location determining receiver 325. Location determining receiver 325 may include, for example, a Global Positioning Satellite (GPS) receiver such a TV-GPS receiver or a LORAN receiver, which is described above. The location information may be received by location determining receiver 325 using, for example, assisted GPS processing. For example, the GPS receiver may communicate with an assistance server that may have access to a reference network. The GPS receiver and the assistance server may share resources to quickly generate the location information of telephone 100. If VoIP adapter 105 includes location determining receiver 325, VoIP adapter 105 may conduct the call from telephone 100 as a VoIP call. Thus, the location information may be provided to call terminal 140 via VoIP network 110, shown in FIG. 2, using packets inserted into a field such as the Session Initiation Protocol (SIP) as described above. Alternatively, the location information may be provided to call terminal 140, shown in FIG. 2, via the cellular network using, the General Packet Radio Services (GPRS) features of the wireless network as described above.

Processor 310 may also be coupled second interface 330. Second interface 330 may communicate signals to and from VoIP network 110, shown in FIG. 2, or the Internet Protocol (IP) Network such as the users voice and the voice at the other end of the conversation.

Figure 5:
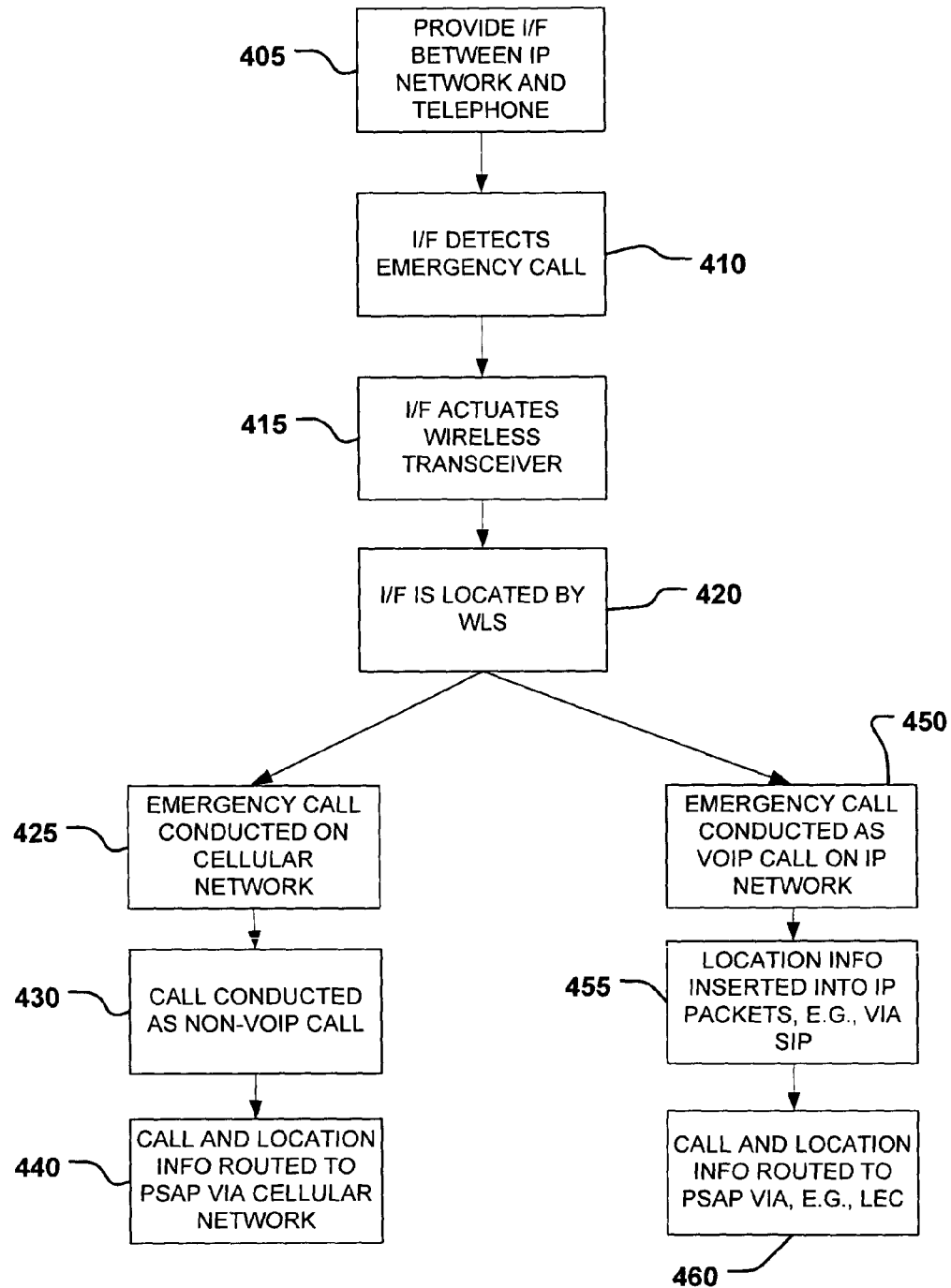
FIG. 5 depicts a block diagram of a method of routing an emergency call according to an example embodiment.

FIG. 5 illustrates a method of routing an emergency call according to an example embodiment. At 405, an interface may be provided between a telephone and an Internet Protocol (IP network). The interface may include, for example, a VoIP adapter. Additionally, the telephone may include, for example, one or more typical analog telephones, one or more portable phones, and microphones and headsets or speakers connected to one or more computers. Additionally, the telephone and interface may be one unit, for example, the VoIP adapter may be a built in feature of the telephone.

At 410, the interface may detect whether an emergency call has been placed via the telephone. If an emergency call has been detected, at 415, a wireless transceiver may be actuated by a processor in the interface. The wireless transceiver may include, for example, include wireless bypass circuitry that converts the VoIP emergency call to an emergency call over a wireless network.

After the wireless transceiver is actuated at 415, the interface may be located by a wireless location system at 420. For example, the interface may be located by conducting an emergency call on a wireless network at 425. The routing of an emergency call may include, for example, at 430, routing the call as a non-VoIP call that may include bypassing the VoIP network and transmitting the call as a typical wireless telephone call over a wireless network. If the call is conducted as a non-VoIP call, the call and location information may be routed to an emergency call terminal such as a PSAP call terminal taker via the wireless network at 440. The call may be routed using the Emergency Services Routing Key (ESRK) and/or Emergency Services Routing Digits (ESRD) that may be similar to typical wireless E911 call routing known to those skilled in the art.

The interface at 420 may also be located by conducting the emergency call as a VoIP over an Internet Protocol (IP) network with an E911 Pseudo-ANI in place of the call number at 450. For example, at 455, location information may be inserted into IP packets transmitted from the telephone call. The location information may include, for example, designated bits in the Session Initiation Protocol (SIP) field. The location information inserted at 455 may be routed to an emergency call terminal such as a PSAP call taker terminal at 460. In one embodiment, the call may be routed to the PSAP via dedicated connections through a Local Area Exchange Carrier (LEC) selective router that funnels calls to the appropriate center using the information in the SIP field. With this connection, the customer information including the reported location may be translated and forwarded via the VoIP network's provisioning center to the ALI database and the calling number and location and/or address can be validated before becoming available to the PSAP. Alternatively, the call may be connected to a call terminal via the IP network that has an E911 Pseudo-ANI in place of the call number. Additionally, a parallel call may be launched on the wireless network to provide location information or location estimation to the call terminal.

What is claimed:

1. An apparatus for facilitating emergency services in connection with a voice over Internet protocol (VoIP) call, comprising:
    a first interface for communicating signals to and from a telephone;
    a second interface for communicating signals to and from an Internet Protocol (IP) network;
    a location determining receiver;
    a processor operatively coupled to said location determining receiver and to said first and second interfaces; and
    a computer readable medium, operatively coupled to said processor, comprising instructions for causing the processor to detect the initiation of an emergency call by said telephone, and to determine the location of said apparatus with said location determining receiver in response to the detection of said emergency call, and instructions for providing location information including a calibrated offset.

2. An apparatus as recited in claim 1, further comprising instructions for automatically obtaining location information.

3. An apparatus as recited in claim 2, further comprising instructions for automatically obtaining location information when the apparatus is turned on.

4. An apparatus as recited in claim 2, further comprising instructions for automatically obtaining location information when the emergency call is detected.

5. An apparatus as recited in claim 2, further comprising instructions for connecting the emergency call to a PSAP (Public Service Answering Point) via the IP network with an E911 Pseudo-ANI in place of the calling number.

6. An apparatus as recited in claim 2, further comprising instructions for inserting location information into an SIP (Session Initiation Protocol) field and conducting the emergency call as a VoIP call.

7. An apparatus as recited in claim 2, wherein said first interface is configured to interface to a single telephone.

8. An apparatus as recited in claim 2, wherein said first interface is configured to interface to multiple telephones.

9. An apparatus as recited in claim 2, wherein said first interface includes a wireless local area network (WLAN) transceiver.

10. An apparatus as recited in claim 2, further comprising an Assisted GPS chip, wherein said location determining receiver includes a GPS receiver and location information is obtained by Assisted GPS processing.

11. An apparatus as recited in claim 10, further comprising instructions for communicating with a server to obtain GPS assistance data.

12. An apparatus as recited in claim 2, wherein said location determining receiver receives and processes signals-of-opportunity of known location origin to determine the location of said apparatus.

13. An apparatus as recited in claim 12, further comprising instructions for communicating with a server to obtain assistance data.

14. An apparatus as recited in claim 3, further comprising instructions for mapping location information, including latitude and longitude information, to a street address, and for providing said street address to a PSAP.

15. An apparatus for facilitating emergency services in connection with a voice over Internet protocol (VoIP) call, comprising:
    a first interface for communicating signals to and from a telephone;
    a second interface for communicating signals to and from an Internet Protocol (IP) network;
    a location determining receiver;
    a processor operatively coupled to said location determining receiver and to said first and second interfaces; and
    a computer readable medium, operatively coupled to said processor, comprising instructions for causing the processor to detect the initiation of an emergency call by said telephone, and to determine the location of said apparatus with said location determining receiver in response to the detection of said emergency call; and instructions for providing location information including a calibrated offset and a computed offset.

16. A method for facilitating emergency services in connection with a voice over Internet protocol (VoIP) call, comprising:
    detecting the initiation of an emergency call by a telephone coupled to an interface between said telephone and an Internet Protocol (IP) network, wherein said detecting is performed within said interface;
    in response to the detection of said emergency call, determining the location of said interface with a location determining receiver within said interface; and
    determining a calibrated offset to associate with the location of the interface.

17. A method as recited in claim 16, further comprising automatically obtaining location information.

18. A method as recited in claim 17, further comprising automatically obtaining location information when the interface is turned on.

19. A method as recited in claim 17, further comprising automatically obtaining location information when the emergency call is detected.

20. A method as recited in claim 17, further comprising connecting the emergency call to a PSAP (Public Service Answering Point) via the IP network with an E911 Pseudo-ANI in place of the calling number.

21. A method as recited in claim 17, further comprising inserting location information into an SIP (Session Initiation Protocol) field and conducting the emergency call as a VoIP call.

22. A method as recited in claim 17, wherein said interface is configured to interface to a single telephone.

23. A method as recited in claim 17, wherein said interface is configured to interface to multiple telephones.

24. A method as recited in claim 17, wherein said interface includes a wireless local area network (WLAN) transceiver for communication with a WLAN telephone.

25. A method as recited in claim 17, further comprising obtaining location information using Assisted GPS.

26. A method as recited in claim 25, further comprising communicating with a server to obtain GPS assistance data.

27. A method as recited in claim 17, further comprising obtaining location information by receiving and processing signals-of-opportunity of known location origin to determine the location of said apparatus.

28. A method as recited in claim 27, further comprising communicating with a server to obtain assistance data to permit utilization of the signals-of-opportunity to determine location information.

29. A method as recited in claim 17, further comprising mapping location information, including latitude and longitude information, to a street address, and for providing said street address to a PSAP.

30. A method as recited in claim 17, wherein said interface comprises a first interface for communicating signals to and from said telephone; a second interface for communicating signals to and from said IP network; a location determining receiver; a processor operatively coupled to said location determining receiver, and to said first and second interfaces; and a computer readable medium, operatively coupled to said processor, comprising instructions for causing the processor to detect the initiation of an emergency call by said telephone, and to determine the location of said interface with said location determining receiver within said interface.

31. A method for facilitating emergency services in connection with a voice over Internet protocol (VoIP) call, comprising:
    detecting the initiation of an emergency call by a telephone coupled to an interface between said telephone and an Internet Protocol (IP) network, wherein said detecting is performed within said interface;
    in response to the detection of said emergency call, determining the location of said interface with a location determining receiver within said interface;
    determining a calibrated offset to associate with the location of the interface; and
    providing location information including a computed offset.

32. A computer readable medium comprising computer executable instructions for instructing a processor to perform a method for facilitating emergency services in connection with a voice over Internet protocol (VoIP) call, said method involving providing an interface between a telephone and an Internet Protocol (IP) network, and comprising:
    within said interface, detecting the initiation of an emergency call by said telephone;
    in response to the detection of said emergency call, determining the location of said interface with a location determining receiver within said interface; and
    determining a calibrated offset to associate with the location of the interface.

33. A computer readable medium as recited in claim 32, further comprising instructions for automatically obtaining location information.

34. A computer readable medium as recited in claim 33, further comprising instructions for automatically obtaining location information when the interface is turned on.

35. A computer readable medium as recited in claim 33, further comprising instructions for automatically obtaining location information when the emergency call is detected.

36. A computer readable medium as recited in claim 33, further comprising instructions for connecting the emergency call to a PSAP (Public Service Answering Point) via the IP network with an E911 Pseudo-ANI in place of the calling number.

37. A computer readable medium as recited in claim 33, further comprising instructions for inserting location information into an SIP (Session Initiation Protocol) field and conducting the emergency call as a VoIP call.

38. A computer readable medium as recited in claim 33, wherein said interface is configured to interface to a single telephone.

39. A computer readable medium as recited in claim 33, wherein said interface is configured to interface to multiple telephones.

40. A computer readable medium as recited in claim 33, wherein said interface includes a wireless local area network (WLAN) transceiver for communication with a WLAN telephone.

41. A computer readable medium as recited in claim 33, further comprising instructions for obtaining location information using Assisted GPS.

42. A computer readable medium as recited in claim 41, further comprising instructions for communicating with a server to obtain GPS assistance data.

43. A computer readable medium as recited in claim 33, further comprising instructions for obtaining location information using signals-of-opportunity of known location origin.

44. A computer readable medium as recited in claim 43, further comprising instructions for communicating with a server to obtain assistance data to permit utilization of said signals-of-opportunity to determine location information.

45. A computer readable medium as recited in claim 33, further comprising instructions for mapping location information, including latitude and longitude information, to a street address, and for providing said street address to a PSAP.

46. A computer readable medium as recited in claim 33, wherein said computer readable medium is contained within said interface, and said interface further comprises a first interface for communicating signals to and from said telephone; a second interface for communicating signals to and from said IP network; and a processor operatively coupled to said location determining receiver and to said first and second interfaces.

47. A computer readable medium comprising computer executable instructions for instructing a processor to perform a method for facilitating emergency services in connection with a voice over Internet protocol (VoIP) call, said method involving providing an interface between a telephone and an Internet Protocol (IP) network, and comprising:

detecting the initiation of an emergency call by a telephone coupled to an interface between said telephone and an Internet Protocol (IP) network, wherein said detecting is performed within said interface;

in response to the detection of said emergency call, determining the location of said interface with a location determining receiver within said interface;

determining a calibrated offset to associate with the location of the interface; and providing location information including a computed offset.

\* \* \* \* \*